US011343893B2

(12) United States Patent
Jooss

(10) Patent No.: US 11,343,893 B2
(45) Date of Patent: May 24, 2022

(54) CONTROLLING AT LEAST TWO SERIES-CONNECTED LIGHT-EMITTING DIODES OF A LIGHTING DEVICE

(71) Applicant: Osram Beteiligungsverwaltung GmbH, Gruenwald (DE)

(72) Inventor: Sebastian Jooss, Dettingen (DE)

(73) Assignee: OSRAM Beteiliungsverwaltung GmbH, Gruenwald (DE)

( * ) Notice: Subject to any disclaimer, the term of this patent is extended or adjusted under 35 U.S.C. 154(b) by 7 days.

(21) Appl. No.: 16/633,174

(22) PCT Filed: Jul. 23, 2018

(86) PCT No.: PCT/EP2018/069934
§ 371 (c)(1),
(2) Date: Jan. 23, 2020

(87) PCT Pub. No.: WO2019/020572
PCT Pub. Date: Jan. 31, 2019

(65) Prior Publication Data
US 2021/0160988 A1    May 27, 2021

(30) Foreign Application Priority Data

Jul. 24, 2017 (DE) ..................... 10 2017 212 643.4
Jan. 26, 2018 (DE) ..................... 10 2018 201 228.8

(51) Int. Cl.
*H05B 45/395* (2020.01)
*H05B 47/105* (2020.01)
(Continued)

(52) U.S. Cl.
CPC ........... *H05B 45/395* (2020.01); *H05B 45/14* (2020.01); *H05B 45/18* (2020.01); *H05B 45/48* (2020.01); *H05B 47/105* (2020.01)

(58) Field of Classification Search
CPC ........ H05B 45/48; H05B 45/18; H05B 45/14; H05B 45/395; H05B 45/105; Y02B 20/30
See application file for complete search history.

(56) References Cited

U.S. PATENT DOCUMENTS 9,307,595 B2    4/2016  Cho et al.
9,398,655 B2 *  7/2016  Rupp ................... H05B 45/345
(Continued)

FOREIGN PATENT DOCUMENTS

DE   102006031679 A1   1/2008
DE   102012207456 A1   11/2013
(Continued)

OTHER PUBLICATIONS

German Search Report issued for corresponding DE application 10 2018 201 228.8, dated Jan. 31, 2019, 8 pages (for informational purpose only).
(Continued)

*Primary Examiner* — Daniel D Chang
(74) *Attorney, Agent, or Firm* — Viering, Jentschura & Partner mbB

(57) ABSTRACT

A method for controlling at least two light-emitting diodes connected in series of a circuit assembly of a lighting device may include supplying the light-emitting diodes with a specifiable current by means of a controllable current source unit. The method may include connecting a bypass element in parallel with at least one of the light emitting diodes. The method may include detecting an electric supply voltage to the series circuit of the light-emitting diodes and the current source circuit, and controlling an electric conductivity of the bypass element based on the detected electric supply voltage and/or the light-emitting diode current.

19 Claims, 11 Drawing Sheets

(51) Int. Cl.
  *H05B 45/14* (2020.01)
  *H05B 45/18* (2020.01)
  *H05B 45/48* (2020.01)

(56) References Cited

U.S. PATENT DOCUMENTS

| | | |
|---|---|---|
| 2006/0175985 A1 | 8/2006 | Huynh et al. |
| 2010/0134018 A1 | 6/2010 | Tziony et al. |
| 2011/0080432 A1 | 4/2011 | Nakazawa et al. |
| 2011/0109245 A1* | 5/2011 | Lin ................ H05B 45/44 315/294 |
| 2011/0121741 A1* | 5/2011 | Yamamoto ........ G09G 3/3406 315/193 |
| 2013/0207559 A1* | 8/2013 | Ferrier .............. H05B 45/48 315/192 |
| 2013/0293129 A1 | 11/2013 | Seider |
| 2014/0232268 A1* | 8/2014 | Kamoi .............. H05B 45/56 315/117 |
| 2015/0108909 A1 | 4/2015 | Rupp |
| 2018/0338364 A1* | 11/2018 | Ido ................... H05B 45/10 |

FOREIGN PATENT DOCUMENTS

| | | |
|---|---|---|
| DE | 102013201439 A1 | 11/2013 |
| WO | 2015165925 A1 | 11/2015 |

OTHER PUBLICATIONS

International Search Report issued for corresponding PCT application PCT/EP2018/069934, dated Oct. 8, 2018, 14 pages (for informational purpose only).

* cited by examiner

CONTROLLING AT LEAST TWO SERIES-CONNECTED LIGHT-EMITTING DIODES OF A LIGHTING DEVICE

CROSS-REFERENCE TO RELATED APPLICATIONS

The present application is a national stage entry according to 35 U.S.C. § 371 of PCT application No.: PCT/EP2018/069934 filed on Jul. 23, 2018; which claims priority to German Patent Application Serial No.: 10 2017 212 643.4, which was filed on Jul. 24, 2017, and also claims priority to German Patent Application Serial No.: 10 2018 201 228.8, which was filed on Jan. 26, 2018; both of which are incorporated herein by reference in their entirety and for all purposes.

TECHNICAL FIELD

The invention relates to a circuit arrangement for a lighting device including at least two series-connected light-emitting diodes and a controllable power source unit, connected in series with the at least two light-emitting diodes, for supplying a predeterminable electric light-emitting diode current to the series-connected light-emitting diodes. Moreover, the lighting device may include an electrical connector for establishing a connection to an electrical power source that provides a supply voltage and including a circuit arrangement connected to the electrical connector. Finally, a method for controlling at least two series-connected light-emitting diodes of a circuit arrangement of a lighting device is also disclosed.

BACKGROUND

The principles of lighting devices of the generic type, of circuit arrangements for such lighting devices and also of methods for the operation thereof are comprehensively known from the prior art, and so there is no need for separate printed evidence in this respect. They usually serve to provide light for illumination purposes, for the purposes of which electric power is supplied from an electric power source. Increasingly, light-emitting diodes are used as illuminants in order to be able to very flexibly set very different illumination scenarios, in order to be able to provide light in energy-saving fashion and/or for similar purposes. In the meantime, there has been a significant increase in the use of light-emitting diodes as illuminants in lighting devices, as a result of which new fields of application also arise for light-emitting diode-based lighting devices, inter alia also in the field of replacing existing illuminants, which are based on, for example, incandescent lamps, gas-discharge lamps or the like.

The use of lighting devices that are based on light-emitting diodes was found to be particularly advantageous, in particular in vehicles, particularly in motor vehicles. The advantage of generating light with a high effectiveness is evident here in particular, wherein a predetermined light output can be achieved with little electric power expenditure.

In order to be able to reach a predetermined luminous flux, it is frequently conventional to operate a plurality of light-emitting diodes together should light-emitting diodes be used; said light-emitting diodes may be disposed in the style of a matrix, for example. For the intended light emission, the light-emitting diodes are at least partly series-connected and supplied with a predetermined light-emitting diode current. As a result, the light output can be reached in predetermined fashion.

As a rule, the light-emitting diode current is a direct current that flows together through the respective series-connected light-emitting diodes. As a result, the same light-emitting diode current is supplied to each of the series-connected light-emitting diodes, and so a substantially equal light emission can be obtained. The light-emitting diode current is a direct current that may optionally also be pulsed for the purposes of setting the luminous flux, for example according to pulse width modulation (PWM) or the like.

In order to be able to obtain a largely uniform light emission by the series-connected light-emitting diodes, the light-emitting diode current is provided, as a rule, by means of a power source unit that provides a predetermined, such as constant light-emitting diode current. Consequently, a likewise substantially uniform light emission can be obtained within a predetermined voltage range, within which the power source unit is able to substantially provide the light-emitting diode current in predetermined fashion. For this purpose, the power source unit is likewise connected in series with the series-connected light-emitting diodes. The supply voltage provided by an electric power source is applied overall across the series circuit formed thereby, as a result of which the necessary electric power is provided.

However, it was found that variations in the supply voltage that exceed a control range of the power source unit may occur during intended operation. By way of example, when used in a motor vehicle, the case may occur where the supply voltage collapses significantly, for example during the starting of a combustion engine or the like, and so a minimally required supply voltage is no longer applied across the series circuit, and therefore the light emission by the series-connected light-emitting diodes overall is significantly impaired in part, if it is not even stopped completely. This is unwanted, at least in the automotive technical field.

SUMMARY

By way of example, the lighting device of the generic type can be used in motor vehicles in a vehicle headlamp. However, the circuit arrangement is not restricted thereto. Modern motor vehicles include a vehicle-side monitoring function for at least some of their vehicle headlamps, the monitoring function monitoring a functionality of the connected vehicle headlamp, in particular the illuminants thereof, during the intended operation of the motor vehicle. In part, such a monitoring function is also prescribed by standards, for example ECE R 48 or the like. What this achieves is that, firstly, a vehicle driver can be informed about the functionality of the respective vehicle headlamp or its illuminant and can introduce appropriate measures in the case of faults. What can moreover be achieved is that vehicle headlamps that are not operable as intended or such illuminants lead to a notification that can automatically bring about further measures, for example a deactivation of an illuminant channel assigned to the respective illuminant, for example in order to be able to avoid dangerous conditions or the like.

To this end, provision is usually made of a vehicle-side monitoring device, which is embodied in adapted fashion for monitoring a respectively assigned illuminant. If a defect of such an illuminant occurs during intended operation, it is possible to install only a structurally equivalent illuminant within the scope of repair or servicing. By contrast, if an illuminant with deviating properties, in particular deviating electrical properties, is installed, this may be detected as a fault by the monitoring device on account of different electrical properties and a corresponding fault notification or a corresponding fault signal can be output. Moreover, the corresponding illuminant channel may even be completely deactivated in an inexpedient case should this be provided on the part of the vehicle.

A non-limiting embodiment includes improving a generic circuit arrangement, a lighting device including such a circuit arrangement and also a generic method in terms of the reliability.

Further advantageous configurations emerge on the basis of features of the dependent claims.

In respect of a circuit arrangement, the circuit arrangement may include:
  at least two series-connected light-emitting diodes,
  a controllable power source unit, connected in series with the at least two light-emitting diodes, for supplying a predeterminable electric light-emitting diode current to the series-connected light-emitting diodes,
  at least one bypass element connected in parallel with one of the at least two light-emitting diodes, and
  a control unit for controlling an electrical conductivity of the bypass element on the basis of a supply voltage that is applied across the series circuit of the at least two light-emitting diodes and the power source unit.

In respect of a generic lighting device, it is proposed, in particular, that the circuit arrangement is embodied.

In respect of the method, it is proposed, in particular that a predeterminable electric light-emitting diode current is supplied to the at least two series-connected light-emitting diodes by means of a controllable power source unit, wherein a bypass element is connected in parallel with at least one of the at least two light-emitting diodes, wherein a supply voltage that is applied across the series circuit of the at least two light-emitting diodes and the power source circuit is detected, and an electrical conductivity of the bypass element is controlled on the basis of the detected supply voltage and/or the light-emitting diode current.

The circuit arrangement exploits the discovery that a suitable light-emitting diode voltage is required for operating the light-emitting diodes during the intended operation of light emission. The light-emitting diode voltage is linked via a current-voltage characteristic to the light-emitting diode current flowing through the light-emitting diode. If the supply voltage now is less than a sum of the light-emitting diode voltages of the at least two light-emitting diodes and a minimum voltage required for operating the power source unit, the circuit arrangement provides for the bypass element to be used to successively short-circuit one of the at least two light-emitting diodes by increasing the electrical conductivity of the bypass element such that the bypass element can adopt the current carrying property of the light-emitting diode current instead of the light-emitting diode connected in parallel with the bypass element. Since the bypass element only requires an extraordinarily low operating voltage for its intended operation, it is consequently possible to reduce the minimally required supply voltage because, specifically, the light-emitting diode voltage is significantly higher when the light-emitting diode current is supplied to the light-emitting diode. As a result, the operation of the remaining at least one light-emitting diode can be maintained for longer, and so a light emission by the remaining light-emitting diodes or a light output by the lighting device still is facilitated even in the case of a greatly reduced supply voltage. Although the luminous flux overall is reduced as a result thereof, a luminous effect can continue to be determined and an illumination function can be realized at least in part.

Naturally, the circuit arrangement is not restricted to include only two series-connected light-emitting diodes, in which one of the light-emitting diodes has a bypass element connected in parallel. Naturally, the principle can be cascaded further, and so individual bypass elements connected in parallel are likewise provided for additional light-emitting diodes in each case, for example for a third or a fourth light-emitting diode or the like. As a result, a very broad operating voltage range can be obtained for the circuit arrangement, and consequently also for the lighting device. There is no need to provide a bypass element connected in parallel for the first light-emitting diode because light emission can no longer be achieved in any case if the supply voltage does not even suffice for operating a single light-emitting diode. However, it may also be expedient to connect a MOSFET in parallel in this case in order to ensure a constant power consumption, for example at lower voltages, if a superordinate controller could otherwise determine a defect of the lighting device.

The supply voltage is detected and the electrical conductivity of the bypass element is controlled on the basis of the detected supply voltage. A separate voltage sensor may be provided to this end, the measured signal of which is evaluated and used to control the bypass element. However, the supply voltage can also be detected using electronic circuit means, for example by means of a voltage divider or the like.

The bypass element is a controllable bypass element that includes at least one control electrode, by means of which its electrical conductivity can be set. Depending on the detected supply voltage, a signal is applied to the control electrode such that the electrical conductivity of the bypass element can be set in suitable fashion. By way of example, the bypass element can be formed by a transistor or the like. A field effect transistor, in particular a normally off metal oxide semiconductor field-effect transistor (MOSFET), is suitable in particularly advantageous fashion. Using a transistor, the light-emitting diode current can be carried in the case of a very small residual voltage. As a result, it is possible to keep the voltage range for the reliable function of the circuit arrangement in respect of the supply voltage very small.

In the present case, the transistor is operated in linear operation. The linear operation differs from the so-called switching operation in transistors by virtue of continuous operating states being able to be adopted. By contrast, as a rule, only two switching states are possible in switching operation, specifically the activated state and the deactivated state of the transistor. In the activated state, a very low electrical resistance is provided between the connectors of the transistor, between which the switching gap is formed, and so high current flow is possible at a very low residual voltage. By contrast, in the deactivated state, the switching gap of the transistor is high resistance; i.e., it provides a high electrical resistance such that substantially no current flow, or only a very low current flow, more particularly a negligible current flow, is present, even when a high voltage is applied to the switching gap.

The linear operation may include the states of the switching operation, but also facilitates a multiplicity of intermediate states therebeyond, in which the switching gap is not completely active or inactive. Accordingly, an electrical conductivity that can be controlled by a suitable control signal at the control electrode of the transistor can be assigned to the switching gap. In particular, the transistor can also be a bipolar transistor. Additionally, provision can naturally also be made for normally-on transistors, for example junction field effect transistors or the like, to find use.

Thus, in particular, the circuit arrangement exploits the possibility of operating the bypass element not only in a switching operation, but also of facilitating intermediate states. As a result, a particularly expedient functionality can be achieved.

The power source unit is an electronic circuit that predetermines a predeterminable current, here the light-emitting diode current, over a certain operating voltage range. This current can be provided substantially as a constant current within the operating voltage range. For this purpose, use can be made of suitable electronic circuits, for example exploiting operational amplifiers or the like. However, transistor circuits that include a closed-loop control function for the purposes of providing the predetermined current are particularly advantageously suitable. By way of example, the current to be set can be realized by means of a current sensor, for example in the form of a resistor, at which a corresponding voltage is tapped, the sensor signal of said sensor, which is the voltage across the resistor in the case mentioned last, being used to set the current. The current itself is set by means of a transistor, such as by means of a MOSFET. The sensor signal of the current sensor is used to provide a control signal for the transistor. The provision of the control signal may include further electronic components, inter alia one or more further transistors, too, in order to be able to facilitate a predeterminable closed-loop control function.

Overall, the circuit arrangement consequently facilitates an improvement in the reliability in respect of the intended operation of the circuit arrangement and a lamp equipped therewith.

Advantageously, the power source unit is embodied to detect the light-emitting diode current and provide a light-emitting diode current signal for closed-loop control of the light-emitting diode current. As a result, the light-emitting diode current can be reliably provided over a broad operational voltage range. At the same time, the closed-loop control function also allows the facilitation of an adjustability of the light-emitting diode current.

Particularly advantageously, the control unit is embodied to regulate the bypass element on the basis of the light-emitting diode current signal. The control unit in turn can be embodied as an electronic circuit, which serves to be able to provide a suitable control signal for the bypass element. In a non-limiting embodiment, the control unit can be formed by a transistor circuit which, in particular, uses a bipolar transistor or else a field effect transistor or the like. It was found to be particularly advantageous if the control unit uses the light-emitting diode current signal to set, in particular regulate, the electrical conductivity of the bypass element. As a result, the functionality of the bypass element can be better adapted to the respective operating conditions of the light-emitting diode. In particular, this renders it possible to be able to better set the dependence on the supply voltage with respect to the electrical conductivity of the bypass element.

According to one development, the circuit arrangement includes an overvoltage detection unit for detecting the supply voltage, said overvoltage detection unit being embodied to deactivate the power source unit in the case of a supply voltage that is greater than a first comparison value. As a result, the overvoltage detection unit serves to protect the power source unit, which, in the case of overvoltage in respect of the large operational voltage, may be supplied with a correspondingly high leakage power when providing the light-emitting diode current. In order to avoid a thermal overload of the power source unit, deactivation can be triggered in the case of a supply voltage that is greater than the first comparison value in order to be able to protect the circuit arrangement, more particularly the power source unit, from damage. The overvoltage detection unit can be formed by a series circuit of a Zener diode and a resistor, which is connected to the supply voltage with one connector and connected to a suitable control connector of the power source unit with a second connector. A deactivation of the power source unit is prompted if the supply voltage is so high that the Zener diode becomes conductive. Thus, the Zener voltage of the Zener diode determines the first comparison value in this configuration. However, the overvoltage detection unit may also be formed by other electronic circuits, which, for example, exploit an operational amplifier or the like. Naturally, the overvoltage detection unit can additionally also control the control unit accordingly.

Moreover, it is proposed that the circuit arrangement includes a temperature detection unit, which is embodied to detect a temperature of at least one of the at least two light-emitting diodes and provide a temperature signal for controlling the power source unit and/or the control unit. It is also possible for the temperature of all light-emitting diodes or else of only a selection thereof to be detected. In a non-limiting embodiment, what can be achieved by the control signal of the temperature detection unit is that the light-emitting diode current is reduced. What this can achieve is that the leakage power of the light-emitting diodes can be reduced during the intended operation. Particularly advantageously, the temperature detection unit is thermally coupled to the at least one light-emitting diodes. By way of example, the temperature detection unit may include a positive temperature coefficient (PTC) resistor, which is thermally coupled to at least one of the light-emitting diodes. However, other circuit arrangements may also find use; these use, for example, a negative temperature coefficient (NTC) resistor, electronic circuits using operational amplifiers and/or the like. In a non-limiting embodiment, the temperature detection unit offers the option of being able to set an activation point and also a gain in respect of the detected temperature. The temperature detection unit provides a temperature control signal for the power source unit and/or the control unit.

Advantageously, the temperature detection unit detects a light-emitting diode voltage of at least one of the at least two light-emitting diodes and said temperature detection unit is further embodied to provide the temperature signal on the basis of the light-emitting diode voltage. As a result of this, properties of the light-emitting diodes, more particularly temperature-dependent properties, can be additionally taken into account. Moreover, this configuration can achieve simple electrical coupling of the temperature detection unit in respect of its functionality.

Further, it is proposed that the power source unit for regulating the light-emitting diode current and/or the control unit for regulating the bypass element includes a bipolar transistor. This can achieve a particularly simple and reliable circuit in relation to the power source unit and the control unit. Moreover, the bipolar resistor is available particularly cost-effectively and compactly.

Furthermore, it is proposed that the circuit arrangement includes a temperature compensation unit that is thermally coupled to the bipolar transistor for the purposes of compensating a temperature drift of said bipolar transistor. To this end, the temperature compensation unit may include at least one suitable temperature-sensory component, such as an NTC resistor. This resistor is thermally coupled to the bipolar transistor such that the temperature of the bipolar transistor can be assigned to a resistance value of the NTC resistor. As a result of this, it is possible to provide a signal that can additionally be supplied to a control electrode of the bipolar transistor, in this case the base of the bipolar transistor, in order to be able to obtain appropriate temperature compensation. By way of example, the NTC resistor may be connected parallel to a base-emitter path of the bipolar transistor.

Further, it is proposed that the circuit arrangement includes a deactivation unit for detecting the supply voltage, said deactivation unit being embodied to deactivate the control unit in the case of a supply voltage that is greater than a second comparison value. In a non-limiting embodiment, the second comparison value is chosen in such a way that the supply voltage is so high that a reliable operation of all light-emitting diodes of the at least two light-emitting diodes is facilitated. This is because an operation of the bypass element is not required in this operational state. By way of example, the deactivation unit can be formed by a series circuit of a Zener diode and a resistor, which is connected to the supply voltage and to the control unit. The control unit is only deactivated once the supply voltage reaches a value such that the Zener diode, which determines the second comparison value, becomes conductive because no restrictions in respect of the operation of the available light-emitting diodes can be recorded at this supply voltage or a higher supply voltage. Only once the supply voltage becomes smaller such that the conductivity of the Zener diode is no longer provided is the control unit activated and a closed-loop control function or open-loop control function in respect of the bypass element released. Further, this configuration is found to be particularly advantageous in being able to avoid the bypass element taking over the light-emitting diode current in the case of a defective light-emitting diode, as a result of which a superordinate vehicle controller is consequently provided with the option of being able to identify a defect of the respective light-emitting diodes.

Furthermore, it is proposed that at least one of the at least two light-emitting diodes is a constituent part of an assembly including a respective light-emitting diode of the at least two light-emitting diodes and a resistor, wherein the respective light-emitting diode of the assembly and the resistor of the assembly are connected in series. Instead of at least one of the at least two light-emitting diodes, it is consequently possible to connect a light-emitting diode-specific series circuit of this respective light-emitting diode of the at least two light-emitting diodes and the resistor. What this can achieve is that a transition from a light-emitting state of the respective light-emitting diode of the at least two light-emitting diodes into the non-light-emitting state can be implemented more softly, or more continuously, i.e., with a lower gradient. Particularly in the case of fast variations in the supply voltage, effects on the light emission of the circuit arrangement or the illumination function can be reduced, for example in relation to flickering, i.e., a short-term, pulse-like increase or change in the luminous flux, in the light and/or the like. In principle, the assembly or the light-emitting diode-specific series circuit can naturally be provided for each of the at least two light-emitting diodes of the circuit arrangement. Provision can also be made for the assembly or the light-emitting diode-specific series circuit to be provided only for those of the at least two light-emitting diodes where the effects on the illumination function are found to be particularly inexpedient. As a result, what can be avoided when adding a light-emitting diode is that, on account of a possible steep voltage increase across the light-emitting diode, there likewise is a steep increase in a luminous flux. This can reduce or avoid possible visually perceptible brightness variations or flickering.

If the assembly or the light-emitting diode-specific series circuit is provided for more than one of the at least two light-emitting diodes, a respective value of the electrical resistance can be chosen to be the same for all of the resistors. Moreover, provision can naturally also be made for the resistance value of the resistors to be chosen to be at least partly different from one another. The choice of a suitable resistance value may be chosen from the respective specific properties of the circuit arrangement, in particular in relation to the light emission or the luminous flux. By way of example, a suitable resistance value may be ascertained empirically, for example in a laboratory, during manufacturing, during servicing of the circuit arrangement and/or the like. Consequently, the resistance value can be adjustable. However, provision can also be made for the resistance value to be able to be set individually in a specific application. To this end, the resistor can be formed by an adjustable resistor, such as, e.g., a potentiometer or the like. Overall, the ergonomics of the illumination can be improved.

Expressed differently, what is possible to achieve is that at least the last of the series-connected light-emitting diodes is provided with a series resistor that smooths the transition region in order to reduce the change in the luminous flux in the transition region from one light-emitting diode to the other (connection). As a result, the change of the luminous flux in the transition region can be implemented less abruptly or in smoothed fashion, as a result of which the flickering effect can consequently be reduced. In principle, all light-emitting diodes could be provided with a suitable series resistor; however, a voltage curve may then be shifted. Consequently, the voltage transition region can also be smoothed for each of the light-emitting diodes (flattening of the characteristic).

Moreover, it is proposed that the bypass element is connected in parallel with the assembly. Consequently, the light-emitting diode-specific series circuit may be connected at least instead of one such light-emitting diode of the at least two light-emitting diodes where the bypass element is connected in parallel. Specifically in this case, the desired functionality in respect of a continuous transition in relation to the light emission of the corresponding light-emitting diode of the at least two light-emitting diodes can be achieved. By contrast, no assembly or series circuit need be provided in the case of a light-emitting diode that has no bypass element connected in parallel because the light emission of said light-emitting diode cannot be influenced directly by any bypass element. Rather, the assembly or the light-emitting diode-specific series circuit is only able to impair voltage properties of the circuit arrangement in such a case, in particular shift of a voltage curve. However, there may be reasons for providing the assembly or the light-emitting diode-specific series circuit in this case, too.

Further, provision can be made for at least that light-emitting diode of the at least two light-emitting diodes in which the dependence of the electrical conductivity of the bypass element on the supply voltage is lowest to be a constituent part of the assembly. In particular, the light-emitting diode-specific series circuit formed thereby can be connected at least for that light-emitting diode of the at least two light-emitting diodes in which the dependence of the electrical conductivity of the bypass element on the supply voltage is lowest. In a non-limiting embodiment, the assembly or the light-emitting diode-specific series connection needs to be provided only for a single light-emitting diode of the at least two light-emitting diodes. As a result of the assembly or the light-emitting diode-specific series circuit not having to be provided for the other light-emitting diode of the at least two light-emitting diodes, the effects on the functionality of the circuit arrangement can be kept low. In particular, this development exploits the effect that visible effects of changing the light emission of the circuit arrangement may arise particularly evidently when operating only a few of the light-emitting diodes. By contrast, if many or substantially all of the light-emitting diodes are activated in respect of the light emission, a change in the light emission of an individual light-emitting diode of the light-emitting diodes need not be conspicuous. In this respect, this development exploits the fact that a relative luminous flux change of the circuit arrangement by a constant value has smaller visible effects in the case of a large overall luminous flux than if a small overall luminous flux were to be changed by the same constant value.

Further, it is proposed that only those light-emitting diodes of the at least two light-emitting diodes for which the bypass element is connected in parallel are a constituent part of a respective assembly. Consequently, the light-emitting diode-specific series circuit is only connected to those light-emitting diodes of the at least two light-emitting diodes in which the bypass element is connected in parallel. This can take account of the fact that effects in relation to a change in the light emission of the circuit arrangement that is as soft or continuous as possible can substantially be achieved if a bypass element is connected in parallel. Since the effect may be reduced in other cases or said effect need not occur, an assembly or light-emitting diode-specific series connection need not be provided in that case.

The advantages and effects specified for the circuit arrangement apply analogously to the lighting device equipped with the circuit arrangement and also to the method, and vice versa. Consequently, method features may also be formulated for apparatus features, and vice versa.

BRIEF DESCRIPTION OF THE DRAWINGS

In the embodiments and figures, components which are the same or of the same type, or which have the same effect, are respectively provided with the same references. The elements represented and their size ratios with respect to one another are not to be regarded as to scale. Rather, individual elements, in particular layer thicknesses, may be represented exaggeratedly large for better understanding.

In detail.

DETAILED DESCRIPTION

Figure 1:
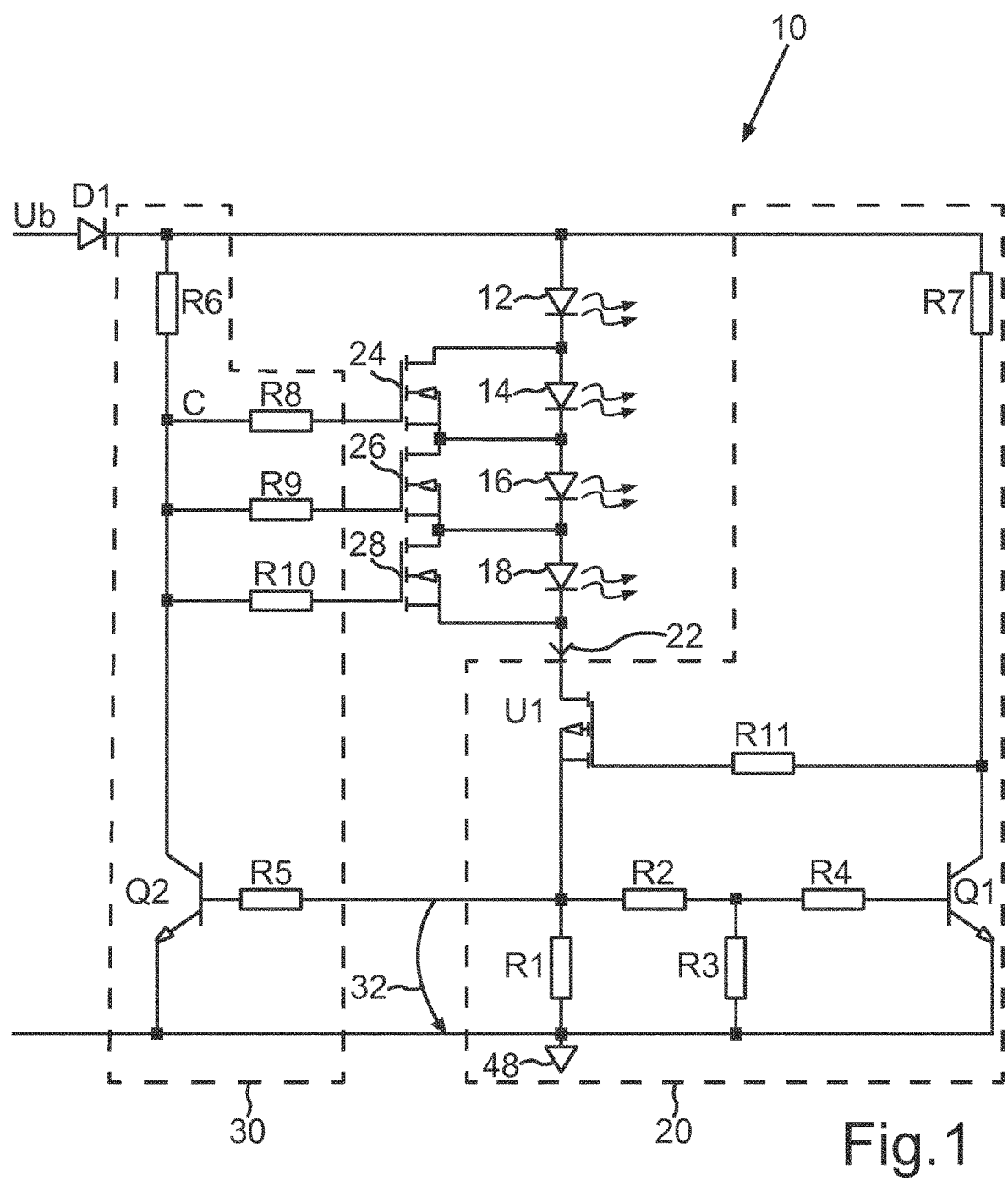
FIG. 1 shows a schematic circuit diagram view of a first configuration of a circuit arrangement.

In a schematic circuit diagram representation, FIG. 1 shows a first configuration of a circuit arrangement 10, which is embodied for arrangement in a lighting device not illustrated in any more detail. The circuit arrangement 10 includes four series-connected light-emitting diodes 12, 14, 16, 18, in relation to which a controllable power source unit 20 is connected in series for supplying the series-connected light-emitting diodes 12, 14, 16, 18 with a predeterminable electric light-emitting diode current 22. One MOSFET 24, 26, 28 is respectively connected directly in parallel as a bypass element for three of the light-emitting diodes, specifically the light-emitting diodes 14, 16, 18.

Further, provision is made of a control unit 30 for controlling an electrical conductivity of the MOSFETs 24, 26, 28 on the basis of a supply voltage Ub, which supply voltage is applied across the series circuit made of the light-emitting diodes 12, 14, 16, 18 and the power source unit 20.

In the present case, the power source unit 20 includes a resistor R1, the light-emitting diode current 22 flowing through said resistor and said resistor serving to detect said light-emitting diode current 22. Accordingly, a voltage signal is provided as light-emitting diode current signal 32, the latter being used to regulate the light-emitting diode current 22. For this purpose, the light-emitting diode current signal 32 is supplied to the base of a bipolar NPN transistor Q1 via a resistor network consisting of the resistors R2, R3 and R4. As a result, the conductivity of the transistor Q1 is controlled on the basis of the light-emitting diode current signal 32.

An emitter of the transistor Q1 is electrically coupled to a reference potential 48. A collector of the transistor Q1 is connected via a resistor R7 to a positive electric potential of the supply voltage Ub. The supply voltage Ub is determined in relation to the reference potential 48. Consequently, the reference potential 48 provides a negative electric potential of the supply voltage Ub.

Further, a first connector of a resistor R11 is connected to the collector of the transistor Q1, said resistor being connected to a gate of a MOSFET U1 with its second connector. The MOSFET U1 is assigned to the power source unit 20—just like the resistor network and the transistor Q1—and serves to set the light-emitting diode current 22. A closed-loop control circuit is formed as a result thereof. The function of this closed-loop control circuit is evident to a person skilled in the art on the basis of the circuit structure and, in principle, requires no further explanations. Using the power source unit 20, the light-emitting diode current 22 can be kept substantially constant within a predetermined operational voltage range, substantially independently of a voltage drop at the power source unit 20. The current to be set can be set, in particular, by a resistance value of the resistor R1.

The control unit 30 likewise includes a bipolar NPN transistor Q2, the emitter of which is likewise connected to the reference potential 48. Via a resistor R5, the base of said bipolar NPN transistor is connected to the resistor R1 of the power source unit 30 and so the light-emitting diode current signal 32 is likewise applied thereto. Thus, the transistor Q2 is controlled on the basis of the light-emitting diode current signal 32.

Via a resistor R6, a collector of the transistor Q2 is connected to the positive electric potential of the supply voltage Ub. Depending on the light-emitting diode current signal 32 and the supply voltage Ub, a voltage consequently sets-in at a point C, a junction of the resistor R6 with the collector of the transistor Q2. Gates of the MOSFETs 24, 26, 28 are connected to the point C via respective resistors R8, R9, R10. Therefore, substantially the same electric potential is applied thereto.

In the case of a sufficient supply voltage Ub, which is still supplied via a diode D1 to the circuit arrangement 10 in the present case in order to avoid polarity reversal, the MOSFETs 24, 26, 28 are not active and the light-emitting diode current 22 flows through the series-connected light-emitting diodes 12, 14, 16, 18 such that the light-emitting diodes 12, 14, 16, 18 emit light as intended. The light-emitting diode current 22 is regulated to the predetermined value by means of the power source unit 20.

If the supply voltage Ub now varies within a predetermined operational range, said supply voltage being a DC voltage in the present case, then this voltage variation is absorbed by the power source unit 20 and so the light-emitting diodes 12, 14, 16, 18 can be operated substantially independently of these variations in their same operational state.

However, if the supply voltage Ub is reduced further, i.e., below a first comparison value, it is no longer possible to provide a sufficient voltage across the series circuit of the light-emitting diodes 12, 14, 16, 18 in order to be able to operate the series-connected light-emitting diodes 12, 14, 16, 18 in their intended operation. With a decreasing supply voltage Ub, there is also a reduction in the respective voltage at the respective source connectors of the MOSFETs 24, 26, 28. Since the gate electrodes of these MOSFETs 24, 26, 28 lie at the same electric potential, the MOSFET 28 will transition first into the conductive state on the basis of the respective low supply voltage Ub and will take up the light-emitting diode current 22. This procedure is continued until the light-emitting diode 18 itself substantially carries no significant light-emitting diode current anymore and, instead, the corresponding light-emitting diode current 22 is conducted in parallel by the MOSFET 28. As a result, the voltage at the light-emitting diode 18 can be reduced ever further such that the operation of the remaining light-emitting diodes 12, 14, 16 can be maintained.

However, if the supply voltage Ub reduces further, the successive deactivation of the light-emitting diodes continues. Consequently, the light-emitting diode 16 is deactivated next by virtue of the MOSFET 26 taking over the light-emitting diode current 22 thereof. In the case of a further reduction in the supply voltage Ub, the MOSFET 24 takes over the light-emitting diode current 22 of the light-emitting diode 14. In the case of a further reduction in the supply voltage UB, the light-emitting diode 12, too, will then no longer be able to emit light. However, connecting a MOSFET in parallel can no longer change anything in respect of this situation, which is why a corresponding MOSFET is not provided for the light-emitting diode 12.

By contrast, if the supply voltage Ub increases again, the light emission and the take-up of the light-emitting diode current 22 by the respective MOSFET 24, 26, 28 for the respective light-emitting diode 14, 16, 18 are reversibly undone again.

This circuit arrangement 10 renders it possible to be able to maintain the functionality of the circuit arrangement 10, particularly the light emission, even in the case of a significantly reduced supply voltage Ub.

It is further evident from FIG. 1 that the control unit 30 likewise contains a closed-loop control function, specifically by using the transistor Q2. This reason also explains the network of resistors R2, R3 and R4 of the power source unit 20, as a result of which, specifically, an activation point of the transistor Q2 lies before an activation point of the transistor Q1. What the closed-loop control function provided by means of the control circuit 30 achieves is that the MOSFETs 24, 26, 28 do not adopt the light-emitting diode current 22 in directly switching fashion but instead are operated in a linear operation, in which a continuous transition is achieved between a full conductivity and a full block of the electrical conductivity of the respective MOSFET of the MOSFETs 24, 26, 28. This means that the power source unit 20 is still able to provide its functionality while the control unit 30 already engages in the operation in regulating fashion. Consequently, two current control loops are formed, which are switched in conjunction with a common current sensor, specifically the resistor R1.

Consequently, when the supply voltage Ub is activated, the MOSFETs 24, 26, 28 are initially in a respective electrically conductive state such that the voltage Ub is only applied across the light-emitting diode 12. With an increasing supply voltage Ub, the light-emitting diodes 14, 16, 18 are successively switched into the active mode, as already explained above, by virtue of the respectively assigned MOSFETs 24, 26, 28 being converted into the non-conductive electrical state.

Figure 5:
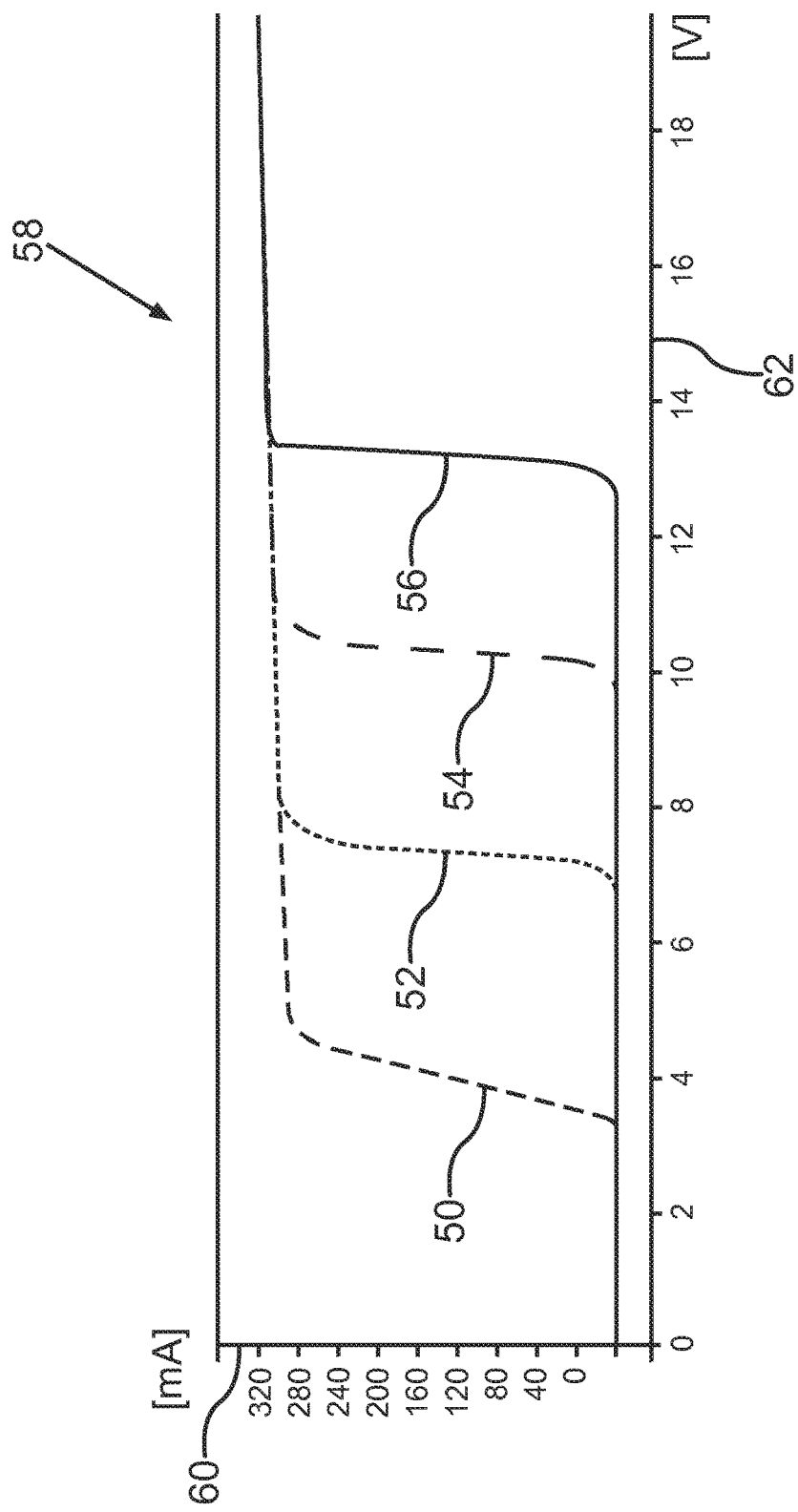
FIG. 5 shows a schematic diagrammatic representation of a current-voltage diagram, in which respective light-emitting diode currents are presented, by means of graphs associated with light-emitting diodes, as a function of a supply voltage for the circuit arrangement according to FIG. 1.

FIG. 5 shows this on the basis of a current-voltage diagram 58. In the diagram 58, an ordinate 60 is associated with the light-emitting diode current 22 and an abscissa 62 is associated with the supply voltage Ub. It is evident from the diagram 58 that the light-emitting diode 12 transitions into the active mode at a voltage of approximately 3.5 volts; this is illustrated by means of the graph 50. It is evident from the diagram 58 that the current increases steeply, approximately to the level of the envisaged light-emitting diode current 22. The light-emitting diode 12 emits light as soon as it carries the full current.

With a further increase in the supply voltage Ub, the MOSFET 24 is regulated into the light-conducting state at approximately 7 volts, whereupon the light-emitting diode 14 adopts the corresponding current. Here, too, there is a steep increase in the light-emitting diode current 22 again, which is illustrated by means of the graph 52 in the diagram 58.

A further increase in the supply voltage Ub to just over 10 volts leads to the MOSFET 26 being converted next from the electrically conductive state into the non-conductive state, whereupon the light-emitting diode 16 carries the current and likewise transitions into the active light emission mode of operation, which is illustrated by the graph 54.

Finally, even the MOSFET 28 is converted into the non-conducting state once a voltage Ub of approximately 13 volts is reached, whereupon the light-emitting diode 18 carries the corresponding current and likewise transitions into the active light emission mode of operation, which is illustrated by means of the graph 56. Consequently, all four light-emitting diodes 12, 14, 16, 18 are in the active light emission operational state above an operating voltage Ub of greater than approximately 13.5 volt.

By means of the closed-loop control by the control circuit 30, the current can be set slightly higher during the steep increase in the light-emitting diode currents 22 than when the MOSFETs 24, 26, 28 are in the conductive state. This can be identified on the basis of FIG. 5 because the maximum current likewise increases slightly with increasing supply voltage Ub.

Figure 2:
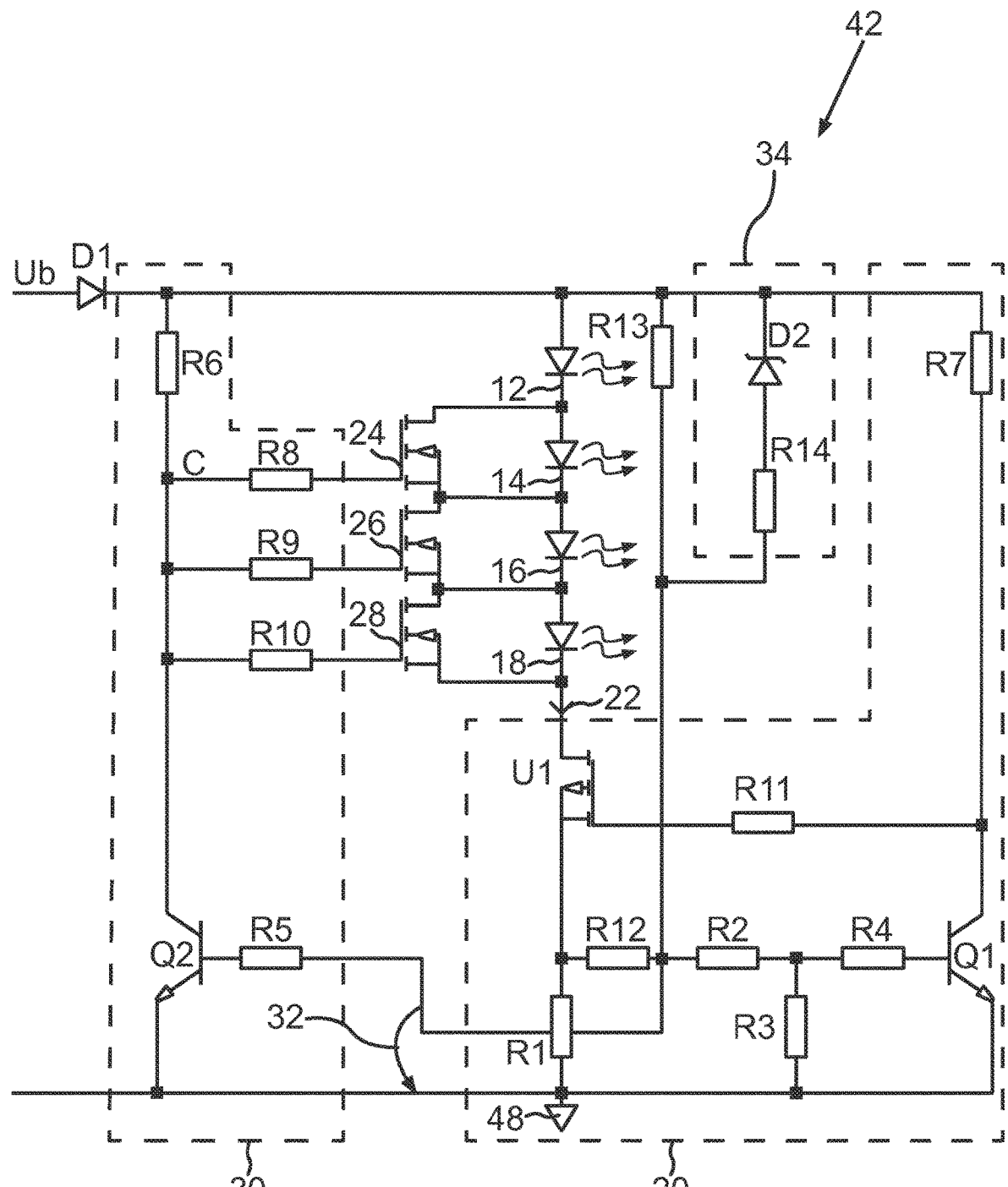
FIG. 2 shows a schematic circuit diagram representation of a second configuration of a circuit arrangement.

FIG. 2 shows a further schematic circuit diagram representation for a circuit arrangement 42; it is based on the circuit arrangement 10 according to FIG. 1, which is why additional reference is made to the explanations in respect thereof. In addition to the configuration according to FIG. 1, the circuit arrangement 42 includes a resistor R13, which serves to linearize the closed-loop control functionality in respect of the transistors Q1 and Q2. As a result, a better closed-loop control function can be obtained.

Moreover, the circuit arrangement 42 includes an overvoltage detection unit 34 for detecting the supply voltage Ub, wherein the overvoltage detection unit 34 is embodied to deactivate the power source unit 20 in the case of a supply voltage Ub that is greater than a first comparison value. For this purpose, the overvoltage detection unit 34 includes a Zener diode D2, which is connected by way of its cathode to the positive electric potential of the supply voltage Ub and connected by way of its anode via a resistor R14 to the power source unit 20 and the control unit 30. Here, a resistor R12 serves the decoupling in relation to the resistor R1.

Should the supply voltage Ub increase in such a way that the Zener diode D2 transitions into the conductive state, there is also an increase in the voltage at a junction of the resistors R12, R2 such that the transistors Q1 and Q2 are turned on. Firstly, this couples the gate potential of the MOSFET U1 to the reference potential 48, just like the gate potentials of the MOSFETs 24, 26, 28. As a result, these transistors are deactivated and the provision of the light-emitting diode current 22 is terminated. What this circuit function can achieve is that the power source unit 20, more particularly the MOSFET U1, is not thermally overloaded in the case where a supply voltage Ub is too high. Thus, this is a protection function for the circuit arrangement 42.

Figure 6:
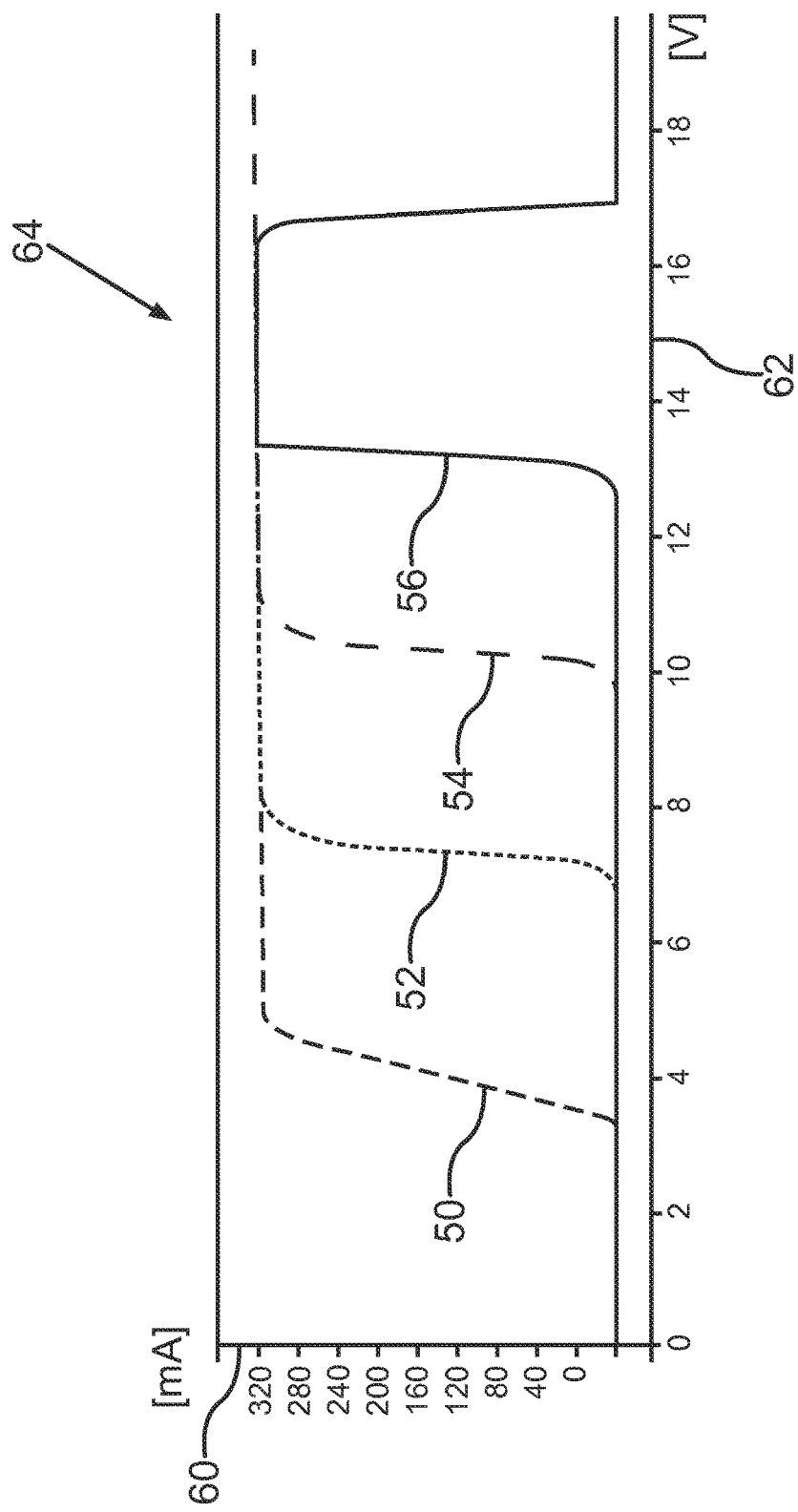
FIG. 6 shows a schematic diagrammatic representation like FIG. 5 for the circuit arrangement according to FIG. 2.

In a schematic diagrammatic representation, FIG. 6 shows a diagram 64 like the diagram 58 illustrated in FIG. 5. The current curves of the light-emitting diodes 12, 14, 16, 18 are denoted accordingly by the graph 50, 52, 54, 56.

It is evident from the diagram 64 that the overvoltage detection unit 34 becomes active in the case of a voltage Ub of greater than approximately 16 volts because the Zener diode D2 becomes conductive. Thus, the first comparison value is reached at this time. As a result, the provision of the light-emitting diode current 22 reduces, as is evident on the basis of the right-hand region of the diagram 64. Consequently, the circuit arrangement 42 is protected against a supply voltage which is greater than approximately 16 volts.

Figure 3:
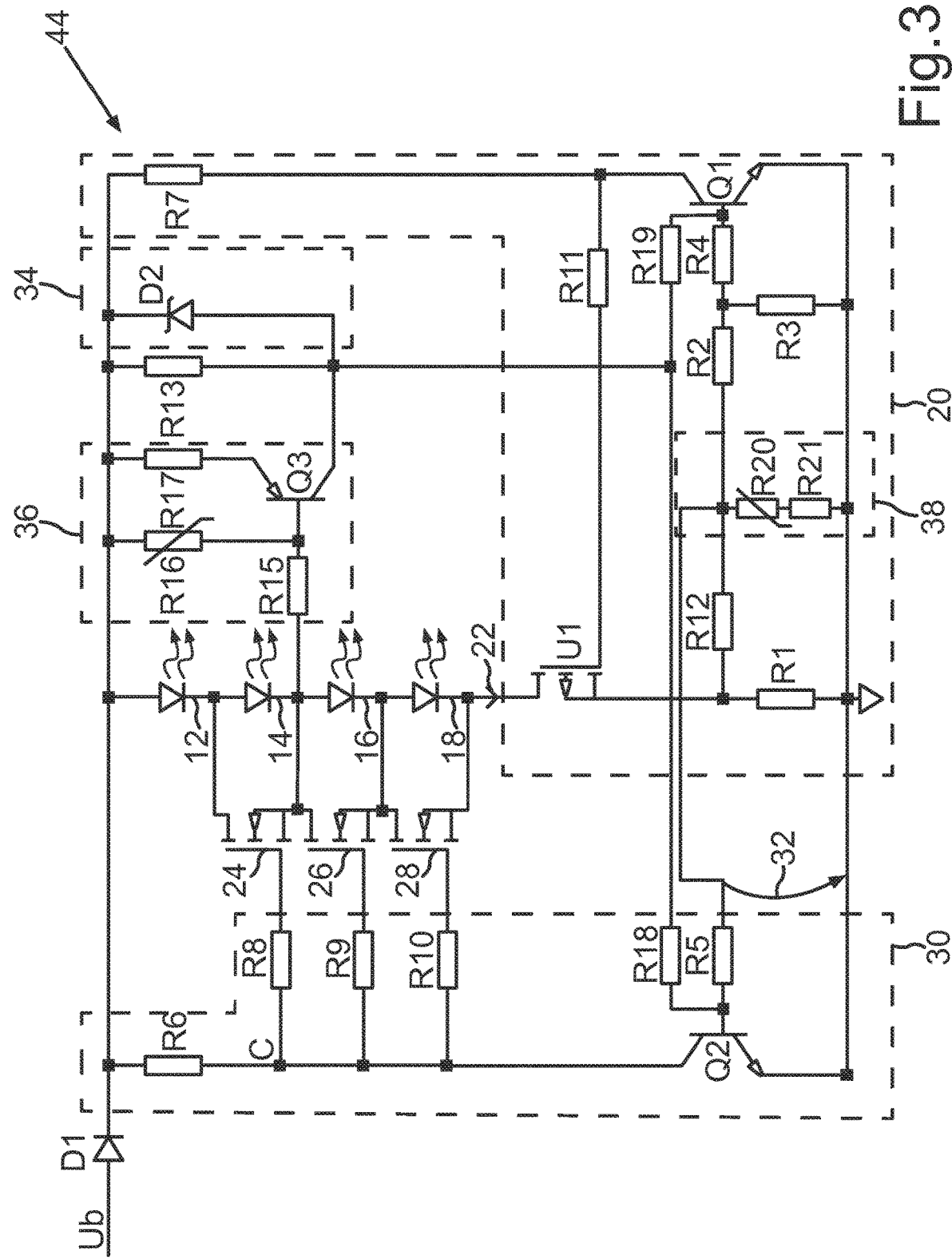
FIG. 3 shows a schematic circuit diagram view of a third configuration of a circuit arrangement.

FIG. 3 shows a further configuration of a circuit arrangement 44, which is based on the circuit arrangement 42 that was explained on the basis of FIG. 2, which is why reference is additionally made to the explanations in that respect.

In addition to the elements known from the circuit arrangement 42, the circuit arrangement 44 includes a temperature detection unit 36, which is embodied to detect a temperature of the light-emitting diodes 12, 14, 16, 18 and to provide a temperature signal for controlling the power source unit 20 and the control unit 30.

In the present case, the temperature detection unit 36 includes an input connector, which is provided by a first connector of a resistor R15, which is connected to a junction of the light-emitting diodes 14, 16. With its opposing second connector, the resistor R15 is connected to a PTC resistor R16 and to a base of a PNP transistor Q3. An emitter of the transistor Q3 is connected to the positive potential of the supply voltage Ub via a resistor R17. A collector of the transistor Q3 is connected to a junction of the resistor R13 with the Zener diode D2. The bases of the transistors Q1 and Q2 can additionally be controlled by way of a resistor network R18, R19 using the signal provided thereby.

Choosing the value of the resistor R15 can set an activation point of the temperature detection unit 36. An increase in the use functionality of the temperature detection unit 36 can be set by a value of the resistor R17. Even if the resistor R15 is connected to a junction of the light-emitting diodes 14, 16 in the present case, the resistor R15 may naturally also be connected to one of the other junctions of other light-emitting diodes. However, an appropriate adaptation of the circuitry should then be provided.

The PTC resistor R16 is thermally coupled to the light-emitting diodes 12, 14, 16, 18. If the detected temperature reaches a predetermined value, which may be determined by the circuit dimensions, the transistor Q3 becomes conductive and draws the base potentials of the transistors Q1 and Q2 via the resistors R18 and R19 in the direction positive potential of the supply voltage Ub. As a result, there is an increase in the electrical conductivity of the transistors Q1 and Q2, and the provision of the light-emitting diode current 22 is terminated as already explained above in relation to the overvoltage detection circuit 34.

Figure 7:
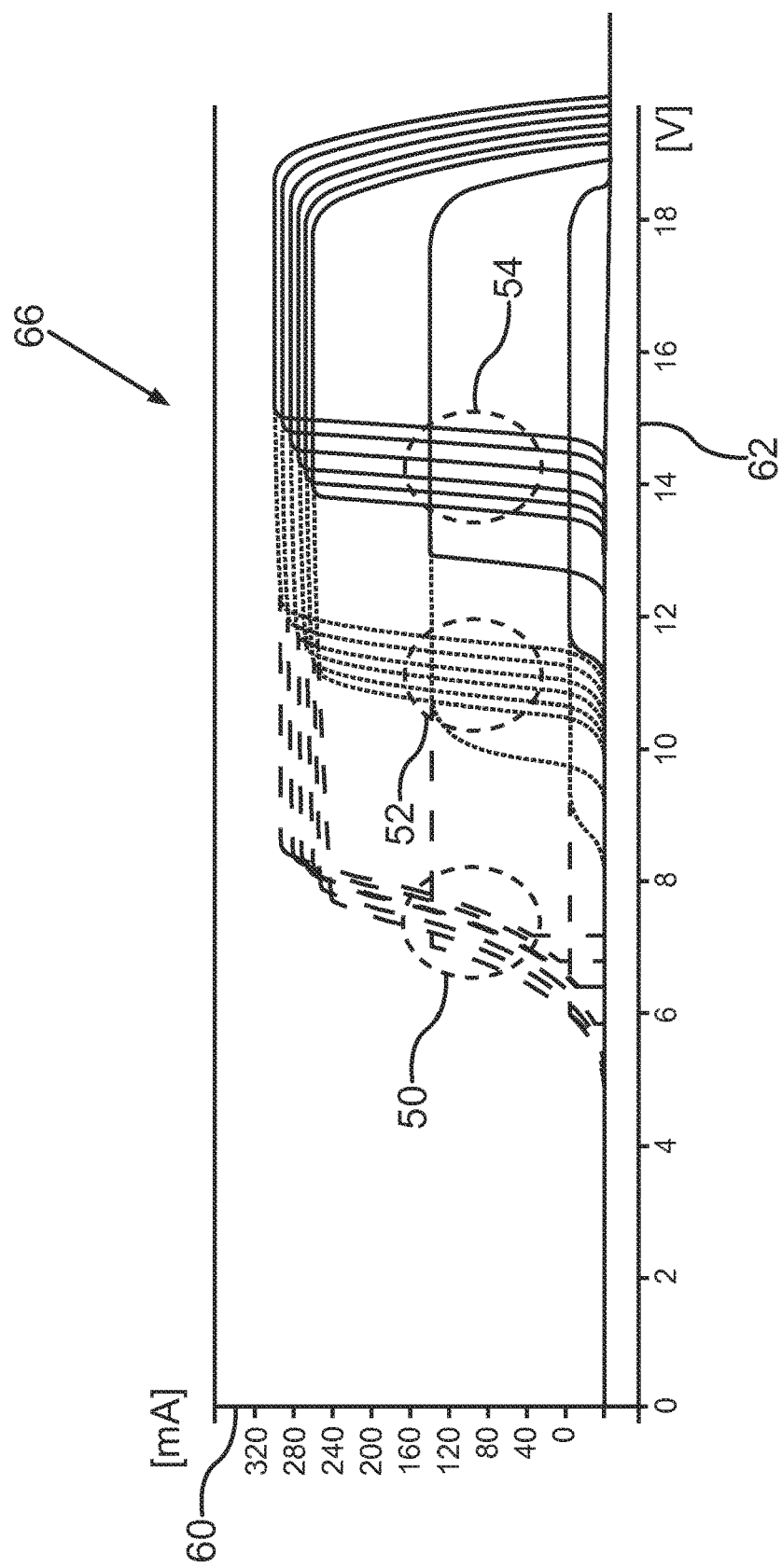
FIG. 7 shows a schematic diagrammatic representation like FIG. 5 for the circuit arrangement according to FIG. 3.

It is further evident from FIG. 3 that the circuit arrangement 44 includes a temperature compensation unit 38, which is thermally coupled to the bipolar transistors Q1 and Q2, for compensating a temperature drift of the bipolar transistors Q1 and Q2. The temperature compensation unit 38 includes resistors R20 and R21, which are series connected in the present case, the resistor R20 being embodied as an NTC resistor. By way of a suitable choice of the resistances, the function of this temperature compensation circuit can be adapted. It is well known that the base-emitter voltage for a predetermined work point of a bipolar transistor reduces with increasing temperature. This decrease in voltage can be compensated by means of the temperature compensation unit 38. The effect of the temperature compensation is evident from a diagram 66 according to FIG. 7. The graph tuples 50, 52, 54 represent the compensations for different temperatures.

Figure 4:
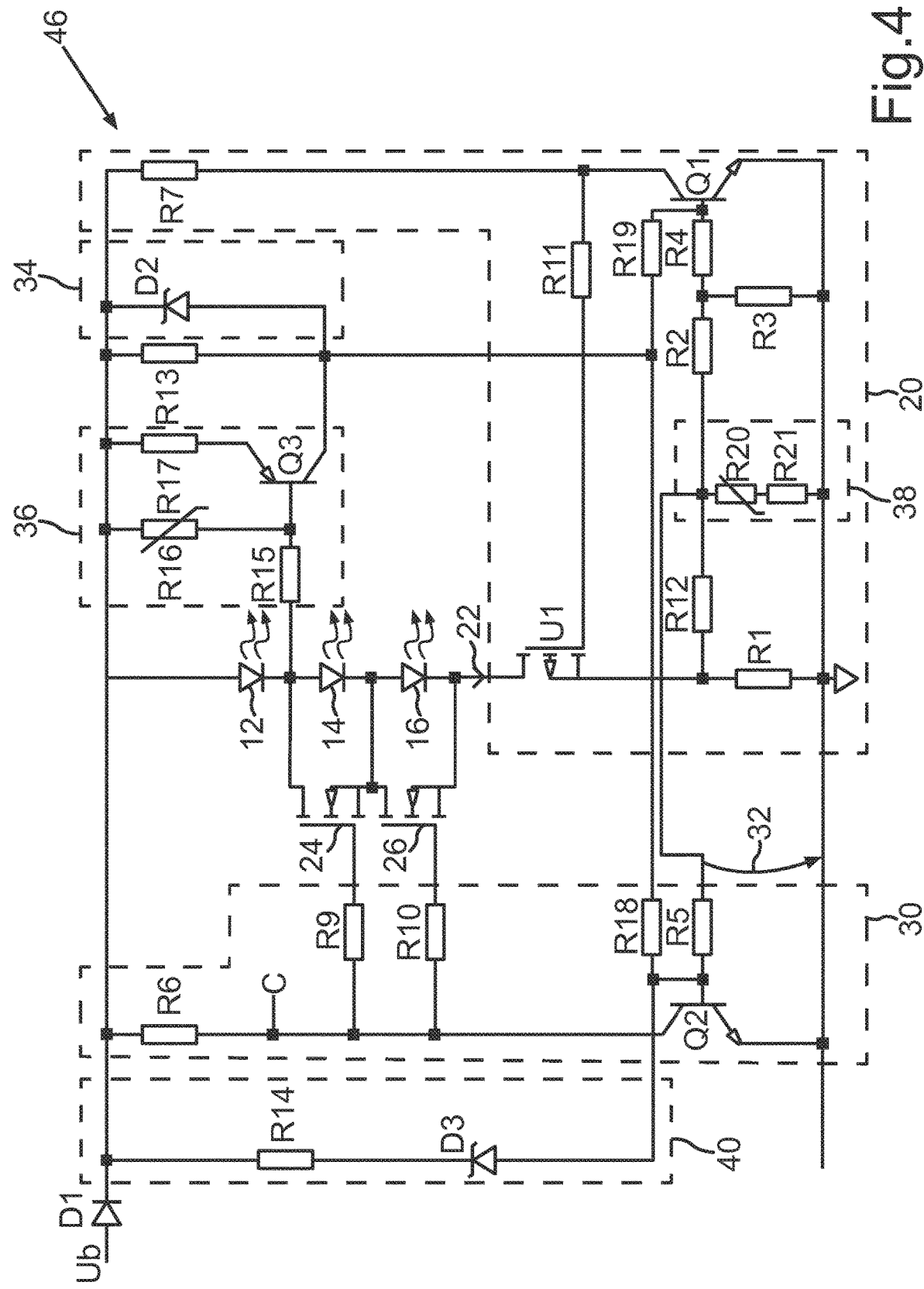
FIG. 4 shows a schematic circuit diagram representation of a fourth configuration of a circuit arrangement.
Figure 8:
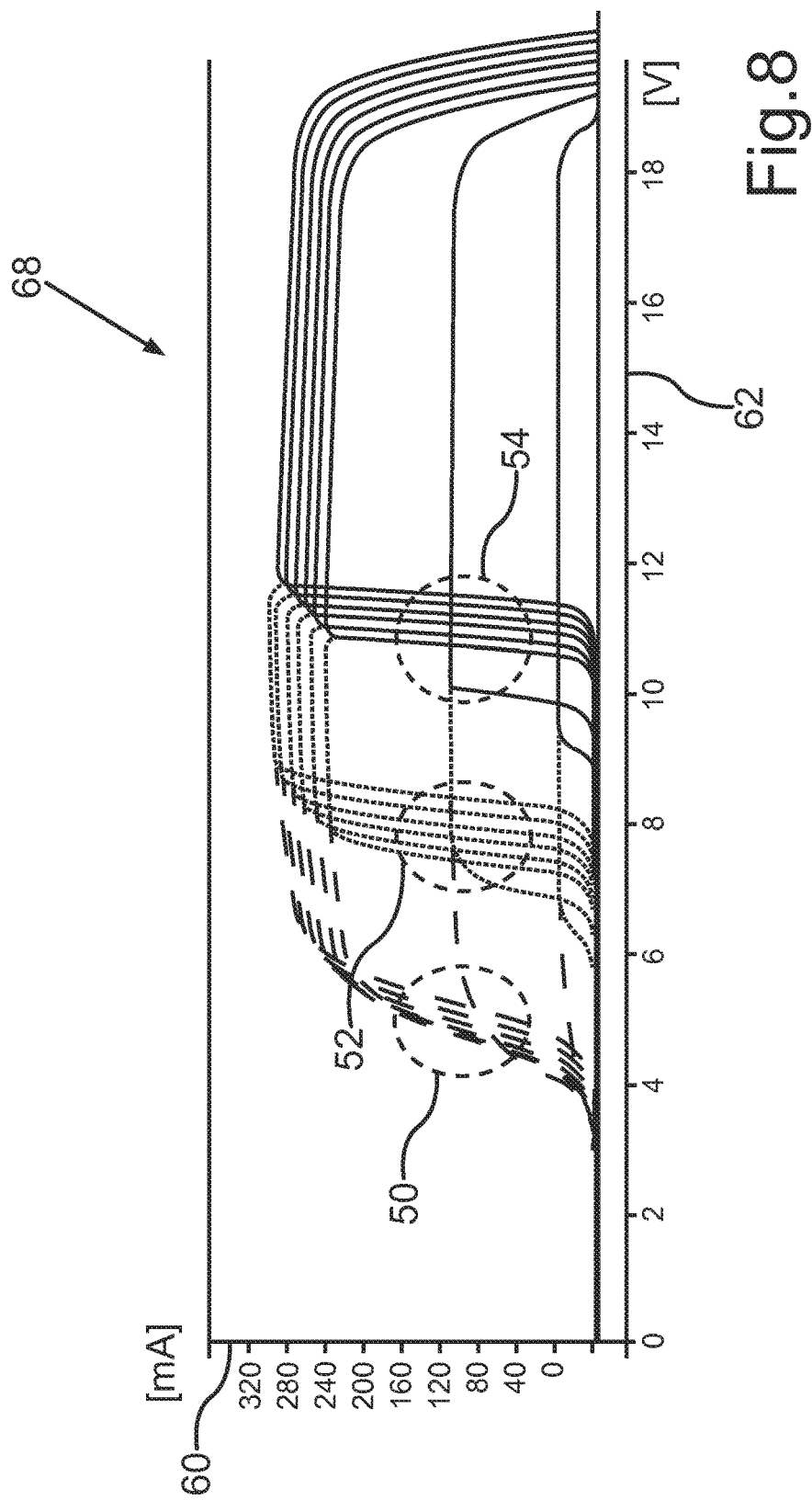
FIG. 8 shows a schematic diagrammatic representation like FIG. 5, in which graphs are used to present the function of the circuit arrangement according to FIG. 4.

FIG. 8 shows a diagram 68, which shows the function of the circuit arrangement according to FIG. 4, in a schematic diagrammatic representation. In contrast to FIG. 7, the voltage-controlled deactivation is shown here, which is realized in FIG. 4 by means of the resistor R14 and the Zener diode D3. This can be identified by way of a small notch in the current curve at approximately 10 V. Further, the action of the temperature detection unit 36 is illustrated. Corresponding graph tuples 50, 52, 54 represent the corresponding temperature dependence.

FIG. 4 shows a further schematic circuit diagram representation for a further configuration of a circuit arrangement 46, which is substantially based on the circuit arrangement 44 as already explained on the basis of FIG. 3.

In addition to the circuit arrangement 44, the circuit arrangement 46 includes a deactivation unit 40 for detecting the supply voltage Ub, wherein the deactivation unit 40 is embodied to deactivate the control unit 30 in the case of a supply voltage Ub that is greater than a second comparison value. The deactivation unit 40 serves to avoid an intervention of the MOSFETs 24, 26 when the value of the supply voltage Ub suffices for an intended operation of the circuit arrangement 46. In this case, the control unit 30 need not be active. This is advantageous in that, in the case of a defect in one of the light-emitting diodes 12, 14, 16, the correspondingly assigned MOSFET 24, 26 cannot take over the light-emitting diode current 22 as a result of reduction in its electrical conductivity. As a result, a superordinate controller, for example a superordinate motor vehicle controller in the case of a motor vehicle, is able to ascertain the functionality of the light-emitting diodes 12, 14, 16. This is because if a defective light-emitting diode 12, 14, 16 were to be deactivated by the MOSFET 24, 26 connected in parallel, the superordinate vehicle controller could not ascertain a defect of this light-emitting diode 14, 16. The deactivation unit 40 can ensure the intended operation of this functionality.

As a result of the deactivation unit 40, the control unit 30 is only active when the supply voltage Ub is smaller than the second comparison value. In the present case, the deactivation unit 40 consists of a series circuit made of a resistor R14 with a Zener diode D3, which is connected between the positive potential of the supply voltage Ub and the base connector of the transistor Q2. Consequently, the second comparison value is determined by the Zener voltage of the Zener diode D3.

Figure 11:
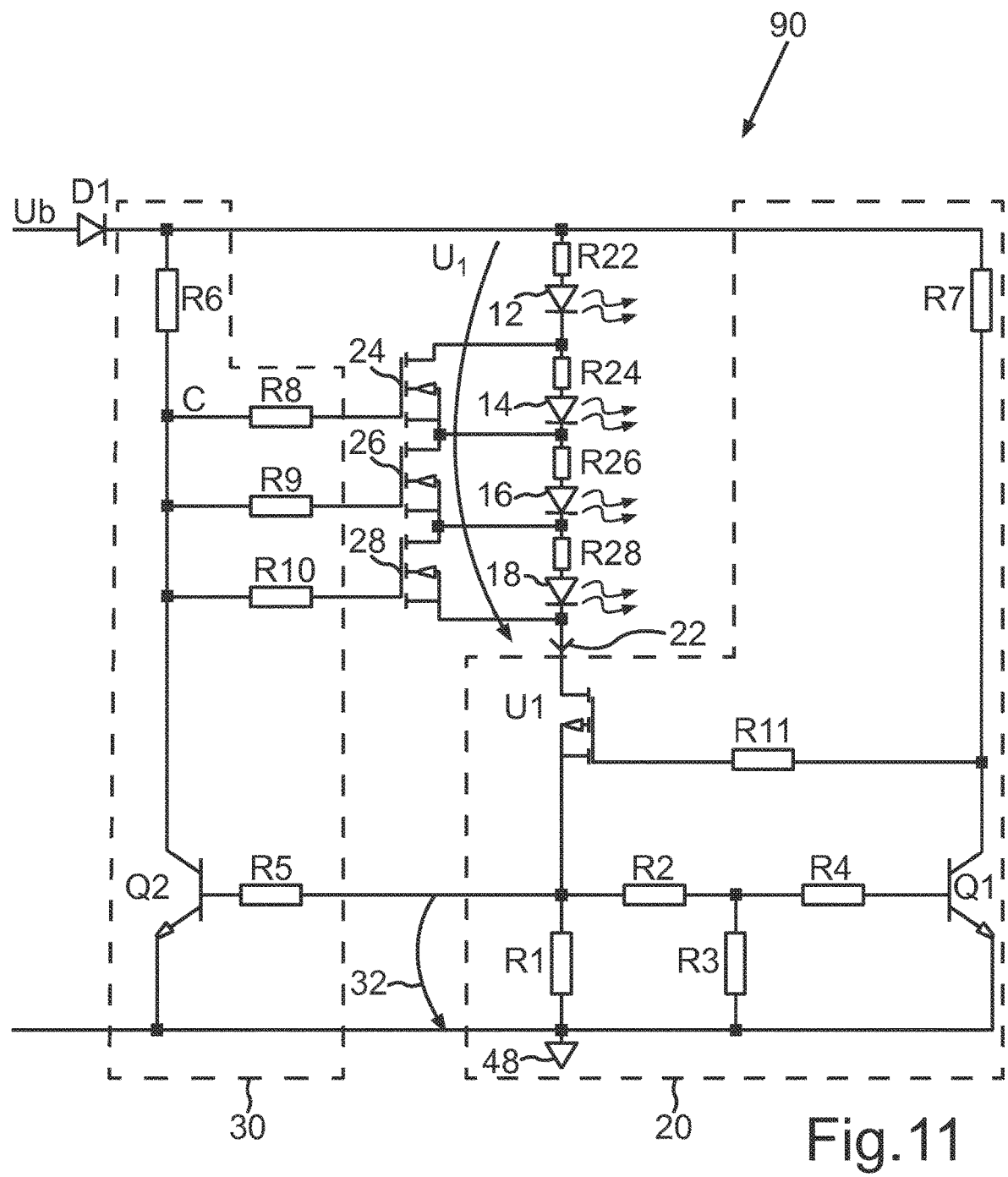
FIG. 11 shows a schematic circuit diagram view of a fifth configuration of a circuit arrangement, which is based on the first configuration according to FIG. 1 and in which, instead of the series-connected light-emitting diodes, light-emitting diode-specific series circuits made of said light-emitting diodes and a respective resistor are connected.

FIG. 11 shows a circuit arrangement 90, which is substantially based on the circuit arrangement 10 according to FIG. 1, which is why additional reference is made to the explanations made above in respect of the circuit arrangement 10.

The circuit arrangement 90 of FIG. 11 differs from the circuit arrangement 10 according to FIG. 1 in that the light-emitting diodes 12, 14, 16, 18 are constituent parts of a respective assembly, which includes a respective light-emitting diode 12, 14, 16, 18 and a respective resistor R12, R14, R16, R18, with the respective light-emitting diode 12, 14, 16, 18 of the respective assembly and the resistor R12, R14, R16, R18 of the respective assembly being connected in series. Instead of the respective light-emitting diodes 12, 14, 16, 18, respective light-emitting diode-specific series circuits of these respective light-emitting diodes 12, 14, 16, 18 and a respective resistor R22, R24, R26, R28 are now connected. A voltage across all series-connected light-emitting diodes 12, 14, 16, 18 and the respectively assigned resistors R22, R24, R26, R28 is denoted by $U_1$. The resistors R22, R24, R26 only have to be provided optionally. Therefore, they may also not be provided, at least in part, or may be dispensed with in other configurations.

Figure 12:
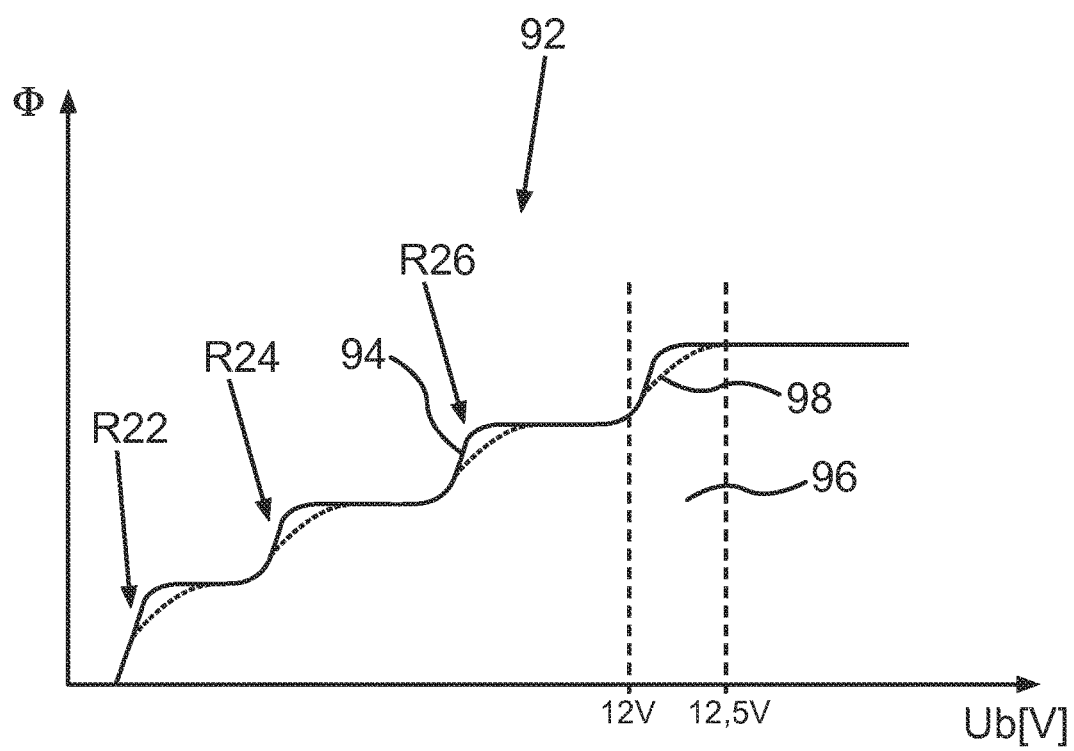
FIG. 12 shows a schematic diagrammatic representation of a luminous flux-voltage diagram, in which a luminous flux emitted by the circuit arrangement according to FIG. 11 is presented, by means of associated graphs, as a function of the supply voltage for the circuit arrangement.

The effect of this configuration can be highlighted on the basis of FIG. 12. FIG. 12 shows a schematic diagrammatic representation of a luminous flux-voltage diagram 92, in which an abscissa is associated with the supply voltage Ub in V and an ordinate is associated with a luminous flux φ of the circuit arrangement 90. A graph 94 represents the dependence of the luminous flux φ on the supply voltage Ub, to be precise for the case of the circuit arrangement 10 according to FIG. 1, i.e., without the resistors R22, R24, R26, R28. The effect of the circuit arrangement 10 can be identified in a region 96. As illustrated on the basis of the graph 94 in a region 96, the luminous flux changes virtually discontinuously or in stepped fashion, depending on the supply voltage Ub. In the case of correspondingly fast variations in the supply voltage Ub in the region 96, this may be inexpediently perceived visually as flickering or the like. Thus, the graph 94 represents the conditions without the resistors R22, R24, R26, R28.

In order to reduce this flickering in the region 96, the resistor R28 is connected in series with the light-emitting diode 18, as is evident on the basis of FIG. 11. The effect of the resistor R28 is elucidated by a graph 98. It is evident from FIG. 12 that a jump or a step illustrated by the graph 94 in the region 96 can be flattened by the effect of the resistor R28, as illustrated by the graph 98 in the region 96. As a result, the transition in the region 96 can be smoothed. What emerges from this is that even the change of the luminous flux φ in the region 96 has become flatter, as a result of which the visual appearance of the flickering can be reduced.

It is likewise possible to identify the effect of the further resistors R22, R24, R26 in the diagram 92; in principle, these may cause a comparable effect as the resistor R28 described above. The resistors R22, R24, R26 need not be mandatory. Therefore, they may also only be provided optionally.

As a result of the resistors R22, R24, R26, R28, the change of the luminous flux φ in the transition region may be implemented less abruptly or in smoothed fashion, i.e., with a smaller gradient, as a result of which it is consequently possible to reduce a flickering effect, for example. This is evident in FIG. 12 from the luminous flux φ that increases approximately in step-shaped fashion with the supply voltage Ub. A respective step of the substantially step-shaped graph 94 can consequently be associated with the functionality of respectively one of the light-emitting diodes 12, 14, 16, 18. Without the resistors R22, R24, R26, R28, there is a steep change in the luminous flux φ, as a result of which the flickering effect may be caused.

This can be reduced by the resistors R22, R24, R26, R28. Considering the graph 98, the effect of a respective one of the resistors R22, R24, R26, R28 can be assigned to respectively one of the steps of the graph 94. As shown by the diagram 90 with the graph 98, the steps of the graph 94 can be flattened. As a result, the flickering effect can be reduced.

In principle, all of the light-emitting diodes 12, 14, 16, 18 can naturally be provided or combined with a suitable series resistor R22, R24, R26, R28, wherein a voltage curve may however shift in that case, to be precise toward a greater voltage in particular. Consequently, a respective voltage transition region, like the region 96, can also be smoothed for each of the light-emitting diodes 12, 14, 16, 18, which is represented by the flattening of the characteristic. What should be noted in this case is that an additional voltage is applied across the respective one of the resistors R22, R24, R26, R28 during the intended operation of the light emission of the circuit arrangement 90, and so the voltage $U_1$ overall will be greater than without the resistors R22, R24, R26, R28 in the circuit arrangement 10 according to FIG. 1.

Figure 9:
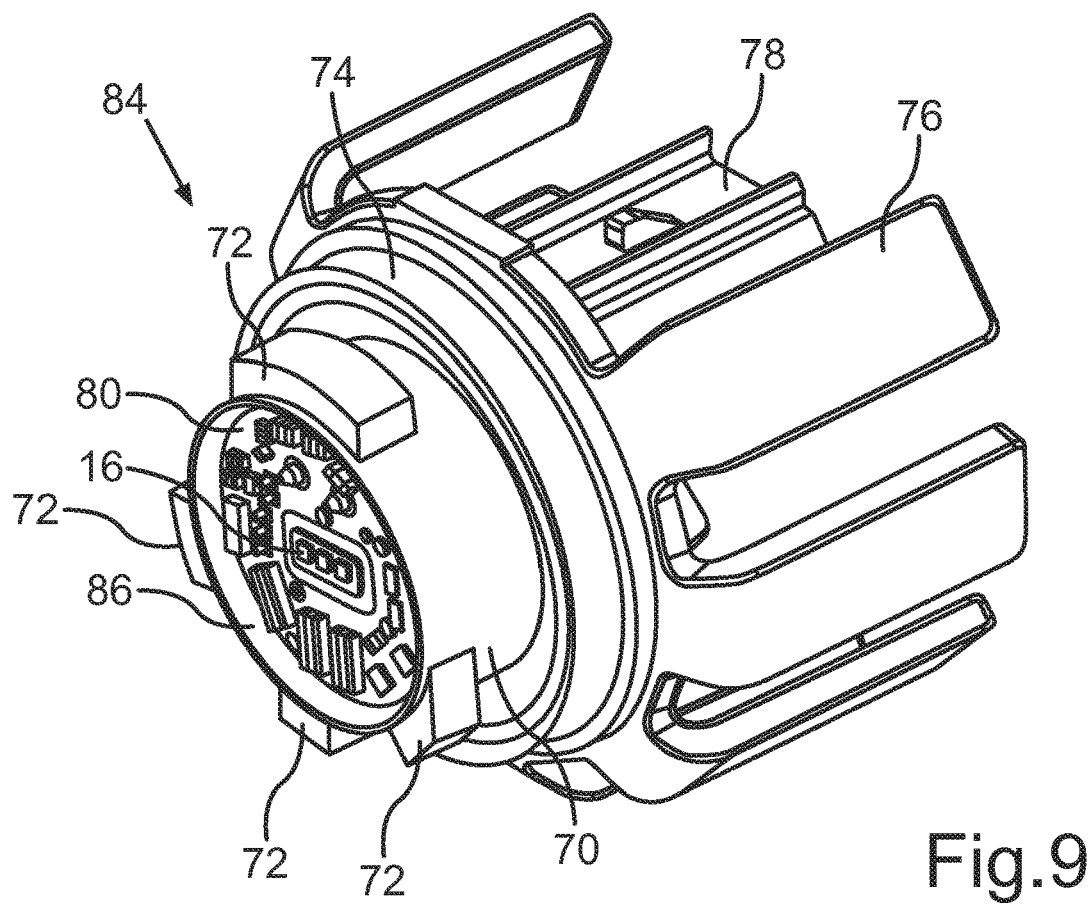
FIG. 9 shows a schematic perspective illustration of an illuminant as a lighting device with an assembly base.

FIG. 9 shows a schematic perspective illustration of an illuminant 84 with an assembly base 86 in the style of a lamp as a lighting device, which can be used as a lamp for fog lights of a motor vehicle. The illuminant 84 has an assembly base 86, by means of which the illuminant 84 can be fastened to a frame not illustrated in any more detail. The assembly base 86 has an approximately circular cylindrical external lateral face 70, from which four key lugs 72 extend radially to the outside. At the end side, the assembly base 86 has a circular cylindrical recess, in which a printed circuit board 80 with a circuit arrangement 10, 42, 44, 46 is disposed. A sealing ring 74 engages around the assembly base 86 at a distance from the key lugs 72.

Moreover, a heatsink 76 extends from the assembly base 86. Said heatsink includes a plurality of cooling fins, which extend axially away from the assembly base 86 counter to a direction in which light is emitted by the circuit arrangement 10, 42, 44, 46. The cooling fins in this case engage around a connector 78 for the illuminant 84, which connector is provided for electrical contacting.

Figure 10:
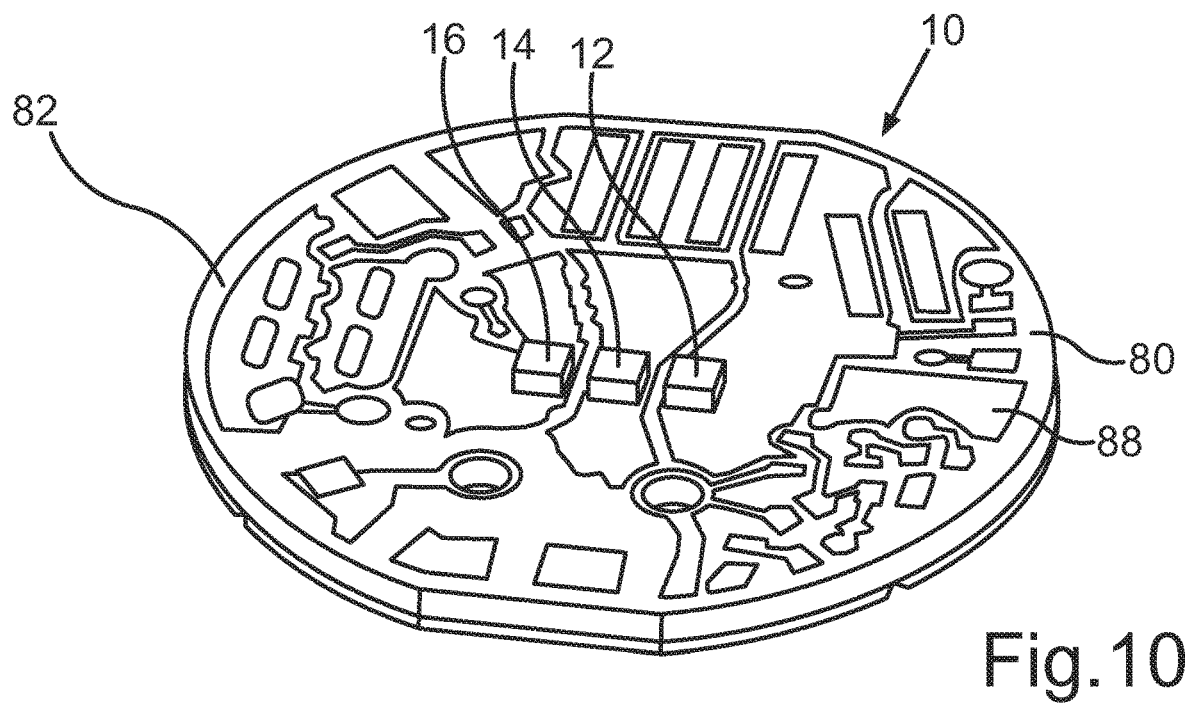
FIG. 10 shows a schematic perspective illustration of a printed circuit board of the illuminant according to FIG. 9, wherein the printed circuit board includes a circuit arrangement.

FIG. 10 shows a schematic perspective illustration of the printed circuit board 80 of the illuminant 84 according to FIG. 9. In the present illustrated case, this is the circuit arrangement 46. The printed circuit board 80 includes a first printed circuit board surface 82 as a placement side and a second printed circuit board surface on the opposite side, which is not illustrated in any more detail in the present case. Consequently, further electronic components (not shown in FIG. 10) are inserted on the printed circuit board top layer, given by the first printed circuit board surface 82, in addition to the light-emitting diodes 12, 14, 16.

Said further electronic components are soldered onto a first copper layer 88 on the printed circuit board top layer of the printed circuit board 80 as surface mounted devices (SMDs). Here, the copper layer 88 is designed in such a way that the desired contacts can be produced. In the case where routing of the circuit is not possible in one plane, a corresponding wiring system can be provided by way of a second copper layer on the second printed circuit board surface of the printed circuit board 80, which wiring system electrically interconnects conductor tracks disposed on the printed circuit board top layer of the printed circuit board 80. For this purpose, through-holes can be applied in the printed circuit board 80, which through-holes establish an electrically conductive connection between the copper layer 88 on the printed circuit board top layer of the printed circuit board 26, i.e., on the first printed circuit board surface, and the copper layer on the second printed circuit board surface, i.e., on the lower side of the printed circuit board 80.

The printed circuit board 80 is connected to a heatsink 76 by way of a layer made of a heat-conducting adhesive, said heatsink serving to dissipate the heat loss arising in the circuit arrangement 46 to the surroundings.

FIG. 10 shows the printed circuit board 80 in an oblique view from the top, in which it is possible to identify the copper layer divided into different networks on the printed circuit board top layer of the printed circuit board 80 and the light-emitting diodes 12, 14, 16 disposed in exemplary fashion on the placement side of the printed circuit board 80 provided at the same time thereby.

In addition to the through-holes possibly required for establishing the electrical connections, use can be made here of further through-holes, the function of which consists of diverting heat from the first printed circuit board surface 82, i.e., the printed circuit board top layer of the printed circuit board 80, to the second printed circuit board surface, i.e., to the lower side of the printed circuit board 80, on account of the good thermal conductivity that is correlated to their good electrical conductivity. On the lower side of the printed circuit board 80, i.e., on the second printed circuit board surface, corresponding large-area regions can be formed in the copper layer 88. As a result of this configuration of the copper layer on the lower side of the printed circuit board 80, it is consequently possible to obtain heat transport in the lateral direction.

On the printed circuit board 80, which is presently formed from an FR4 material and partly equipped with thermal through-holes with a wall strength of usually approximately 25 μm copper, the light-emitting diodes 12, 14, 16 are directly adhesively bonded to the copper layer 88 of the printed circuit board 80. This is also referred to as the chip-on-board process, abbreviated COB. This construction only allows qualified optimal thermal spreading of the heat loss of the light-emitting diodes 12, 14, 16 since the thickness of the copper area of a conventional and commercially available FR4 printed circuit board is typically only between 35 μm and 70 μm. Heating therefore mainly occurs directly through the printed circuit board 80 into the cooling body in the form of the heatsink 76. Pronounced and thermally advantageous spreading of the heat in the lateral direction does not take place here. A heat-conductive adhesive is used to connect the printed circuit board 80 (PCB) to the heatsink 76.

The exemplary embodiments only serve to explain the invention and are not intended to restrict the latter. Naturally, other functional units, by means of which the closed-loop controls and functions can be realized, may also be provided for the realization of the functions. By way of example, to this end, provision can be made for use to be made of circuit arrangements with operational amplifiers. A further integration of components may also be provided such that the circuit arrangements 10, 42, 46 may, at least in part, also be embodied as an integrated circuit.

LIST OF REFERENCE SIGNS

10 Circuit arrangement
12 Light-emitting diode
14 Light-emitting diode
16 Light-emitting diode
18 Light-emitting diode
20 Power source unit
22 Light-emitting diode current
24 MOSFET
26 MOSFET
28 MOSFET
30 Control unit
32 Light-emitting diode current signal
34 Overvoltage detection unit
36 Temperature detection unit
38 Temperature compensation unit
40 Deactivation unit
42 Circuit arrangement
44 Circuit arrangement
46 Circuit arrangement
48 Reference potential
50 Graph
52 Graph
54 Graph
56 Graph
58 Diagram
60 Ordinate
62 Abscissa
64 Diagram
66 Diagram
68 Diagram
70 External lateral surface
72 Key lug
74 Sealing ring 76 Heatsink
78 Connector
80 Printed circuit board
82 Printed circuit board surface
84 Illuminant
86 Assembly base
88 Copper layer
90 Circuit arrangement
92 Diagram
94 Graph
96 Region
98 Graph
D1 Diode
D2 Zener diode
D3 Zener diode
U1 MOSFET
R1 Resistor
R2 Resistor
R3 Resistor
R4 Resistor
R5 Resistor
R6 Resistor
R7 Resistor
R8 Resistor
R9 Resistor
R10 Resistor
R11 Resistor
R12 Resistor
R13 Resistor
R14 Resistor
R15 Resistor
R16 PTC-Resistor
R17 Resistor
R18 Resistor
R19 Resistor
R20 NTC-Resistor
R21 Resistor
R22 Resistor
R24 Resistor
R26 Resistor
R28 Resistor
Q1 NPN-Transistor
Q2 NPN-Transistor
Q3 PNP-Transistor
Ub Supply voltage
$U_1$ Voltage of the series-connected light-emitting diodes
$\phi$ Luminous flux

The invention claimed is:

1. A circuit arrangement for a lighting device, wherein the circuit arrangement comprises:
    at least two series-connected light-emitting diodes,
    a controllable power source unit connected in series with the at least two light-emitting diodes for supplying a predeterminable electric light-emitting diode current to the series-connected light-emitting diodes, wherein the controllable power source unit is configured to absorb a voltage variation of a supply voltage within a predetermined range, wherein the controllable power source unit comprises a first closed-loop control circuit,
    at least one bypass element connected in parallel with one of the at least two light-emitting diodes, and
    a control unit for controlling an electrical conductivity of the at least one bypass element on the basis of the supply voltage that is applied across the series circuit of the at least two light-emitting diodes and the controllable power source unit.

2. The circuit arrangement as claimed in claim 1, wherein the controllable power source unit is configured to detect the predeterminable electric light-emitting diode current and provide a light-emitting diode current signal for closed-loop control of the predeterminable electric light-emitting diode current.

3. The circuit arrangement as claimed in claim 2, wherein the control unit is configured to regulate the at least one bypass element on the basis of the light-emitting diode current signal.

4. The circuit arrangement as claimed in claim 1, further comprising an overvoltage detection unit for detecting the supply voltage, said overvoltage detection unit being configured to deactivate the controllable power source unit when a supply voltage is greater than a first comparison value.

5. The circuit arrangement as claimed in claim 1, further comprising a temperature detection unit configured to detect a temperature of at least one of the at least two light-emitting diodes and provide a temperature signal for controlling the controllable power source unit and/or the control unit.

6. The circuit arrangement as claimed in claim 5, wherein the temperature detection unit detects a light-emitting diode voltage of at least one of the at least two light-emitting diodes and said temperature detection unit is further configured to provide the temperature signal based on the light-emitting diode voltage.

7. The circuit arrangement as claimed in claim 1, wherein the controllable power source unit for regulating the predeterminable electric light-emitting diode current and/or the control unit for regulating the at least one bypass element comprises a bipolar transistor.

8. The circuit arrangement as claimed in claim 7, further comprising a temperature compensation unit thermally coupled to the bipolar transistor for the purposes of compensating a temperature drift of said bipolar transistor.

9. The circuit arrangement as claimed in claim 1, further comprising a deactivation unit for detecting the supply voltage, said deactivation unit being configured to deactivate the control unit when a supply voltage is greater than a second comparison value.

10. The circuit arrangement as claimed in claim 1, wherein at least one of the at least two light-emitting diodes is a constituent part of an assembly comprising a respective light-emitting diode of the at least two light-emitting diodes and a resistor, wherein the respective light-emitting diode of the assembly and the resistor of the assembly are connected in series.

11. The circuit arrangement as claimed in claim 10, wherein the at least one bypass element is connected in parallel with the assembly.

12. The circuit arrangement as claimed in claim 11, wherein at least that light-emitting diode of the at least two light-emitting diodes in which the dependence of the electrical conductivity of the at least one bypass element on the supply voltage is lowest is a constituent part of the assembly.

13. The circuit arrangement as claimed in claim 10, wherein only those light-emitting diodes of the at least two light-emitting diodes for which the at least one bypass element is connected in parallel are constituent part of a respective assembly.

14. A lighting device comprising an electrical connector for establishing a connection to an electrical power source that provides a supply voltage and comprising a circuit arrangement connected to the electrical connector, wherein the circuit arrangement is configured as claimed in claim 1.

15. A method for controlling at least two series-connected light-emitting diodes of a circuit arrangement of a lighting device, wherein the method comprises:

supplying a predeterminable electric light-emitting diode current to the at least two series-connected light-emitting diodes by a controllable power source unit, wherein a bypass element is connected in parallel with at least one of the at least two light-emitting diodes, wherein the controllable power source unit comprises a first closed-loop control circuit, applying a supply voltage across the series circuit of the at least two light-emitting diodes and detecting the controllable power source unit, absorbing, by the controllable power source unit, a voltage variation of the supply voltage within a predetermined range, and controlling, by a control unit, an electrical conductivity of the bypass element based on the detected supply voltage and/or the predeterminable electric light-emitting diode current.

16. The circuit arrangement as claimed in claim 1, wherein the at least two series-connected light-emitting diodes are configured to operate independently of the voltage variation of the supply voltage.

17. The circuit arrangement as claimed in claim 1, wherein the controllable power source unit is directly connected to a positive electric potential of the supply voltage.

18. The circuit arrangement as claimed in claim 1, wherein the control unit comprises a second closed-loop control circuit.

19. The circuit arrangement as claimed in claim 18, wherein the first closed-loop control circuit and the second closed-loop control circuit are both switched in conjunction with a current sensor common to both of the first closed-loop control circuit and the second closed-loop control circuit.

* * * * *